United States Patent [19]
Ogura et al.

[11] Patent Number: 5,212,604
[45] Date of Patent: May 18, 1993

[54] METHOD AND APPARATUS FOR PROCESSING POSITIONING SIGNALS IN A RECORD

[75] Inventors: Shirou Ogura; Masahiro Mizuno, both of Kanagawa, Japan

[73] Assignee: Mitsubishi Denki Kabushiki Kaisha, Japan

[21] Appl. No.: 525,126

[22] Filed: May 17, 1990

[30] Foreign Application Priority Data

May 17, 1989 [JP] Japan ................................. 1-123157

[51] Int. Cl.$^5$ .............................................. G11B 5/596
[52] U.S. Cl. .................................................. 360/77.11
[58] Field of Search ............... 360/77.02, 77.03, 77.05, 360/77.07, 77.08, 77.11, 78.11

[56] References Cited
U.S. PATENT DOCUMENTS

| | | | |
|---|---|---|---|
| 4,068,269 | 1/1978 | Commander et al. | 360/78 |
| 4,115,823 | 9/1978 | Commander et al. | 360/77 |
| 4,782,404 | 11/1988 | Baba | 360/77 |
| 4,980,784 | 12/1990 | Ogura | 360/77.11 |
| 5,012,363 | 4/1991 | Mine et al. | 360/77.05 |

*Primary Examiner*—Aristotelis Psitos
*Assistant Examiner*—Won Tue C. Kim
*Attorney, Agent, or Firm*—Wolf, Greenfield & Sacks

[57] ABSTRACT

A recording device includes a first unit operable in response to head positioning information to generate a first positioning signal for positioning a head at a predetermined track and a second unit operable in response to the first positioning signal to generate a second positioning signal for positioning the head at either a track between adjacent predetermined tracks or a position correction information area which is offset from the data area, thereby providing a high density and high precision recording device.

13 Claims, 14 Drawing Sheets

SERVO TRACK DATA | DATA TRACK | DATA TRACK FORMED BY FIRST EMBODIMENT

POSITION CORRECTION INFORMATION AND DATA TRACK FORMED BY SECOND EMBODIMENT

METHOD AND APPARATUS FOR PROCESSING POSITIONING SIGNALS IN A RECORD

BACKGROUND OF THE INVENTION

1. Field of the Invention

The present invention relates to recording devices, such as magnetic disk devices, and, more particularly, to a head positioning device.

2. Description of the Prior Art

A magnetic disk device will be taken as an example of the recording devices, and the positioning of the magnetic head will be described below.

There are two modes of positioning the magnetic head. One mode is to move the magnetic head over a number of tracks. It is desired that the magnetic head reaches the target track as fast as possible and that when it reaches the target track, the moving speed is almost zero. The other mode is to make the magnetic head follow a specific track. The tracking error of the magnetic head should be small.

A conventional head positioning device is shown in FIG. 10. It includes magnetic disks 10 as a recording medium; a servo surface 1 on which positioning information is recorded; a servo head 2 for reading the positioning information from the servo surface 1; data surfaces 5; data heads 6; a position error detecting circuit 3 for processing the positioning information from the servo surface 1 to generate position signals 45 and 46; a position controlling circuit 4 in response to the position signals 45 and 46 to generate a linear signal 41; a position correcting circuit 8 in response to the linear signal 41 to generate a feedback signal 12 for controlling the position and speed of the magnetic head; a power amplifier 9 for amplifying the feedback signal 12; an actuator 11 for moving the magnetic head; and a motor 13 for moving the actuator.

The manner in which the position error detecting circuit 3 responds to the positioning information read from the servo surface 1 to generate position signals 45 and 46 will be described with reference to FIG. 11. Characters N and S represent north and south magnetic poles recorded on the servo surface 1, respectively. A servo pattern 61 consisting of these Ns and Ss forms positioning information. Data tracks 83a, 83b, ..., 83e, which do not actually exist on the servo surface, are shown by broken lines in order to indicate the positional relationship to the servo tracks 63a, 63b, ..., 63e which are offset a half track from the data track.

Waveforms 62a and 62b are read out by scanning the servo pattern 61 in the direction of an arrow with the servo head 2 at positions 2a and 2b, respectively. The signal 45 is a position signal A which is a difference between the E position signal and the F position signal of the readout waveforms 62a and 62b with the servo head at respective positions. The signal 46 is a position signal B which is a difference between the G position signal and the H position signal of the readout waveforms 62a and 62b, with the servo head at respective positions.

In this way, the servo head 2 generates the waveform 62 based on the N−S pattern of a servo track 63. When the signal differences (E−F) and (G−H) are computed based on respective head positions, the resulting positioning signals A and B are offset by a quarter period with respect to each other. These signals are inputted to the position control circuit 4.

The operation of the two-phase servo system, in which two positioning signals are offset by a quarter period, will be described with reference to FIGS. 12 and 13.

FIG. 12 shows in block form a conventional position control circuit. As has been described above, the positioning information or servo pattern 61 written on the servo surface 1 is read by the servo head 2 and converted by the position error detecting circuit 3 into continuous and periodic positioning signals A and B which are offset by a quarter period from each other. The positioning signals 45 and 46 are processed in the comparative operation circuit 15 to generate a window signal 42. With this window signal 42, one of the positioning signals 45 and 46 or their inverted signals 55 and 56 is outputted as a linear signal 41.

The operation will be described with reference to FIG. 13. All the areas on tracks 83a, ..., 83f are divided into two sections by the fact that the position signal A is greater than the position signal B as shown by a logic signal X. Similarly, when they are divided by the fact that the position signal A is greater than the inverted position signal B, a logic signal Y offset by a quarter period from the logic signal X is obtained. Four window signals 42a–42d are generated by combinations of these logic signals, positive and negative.

These processes are carried out by the comparative operation circuit 15 of FIG. 12 An analog switch 16 outputs as a linear signal 41 only a signal selected by the window signal 42 from four signals; namely, the position signal 45, its inverted signal 55 from the inverter circuit 51, the position signal 46, and its inverted signal 56 from the inverter circuit 52. The position correcting circuit 8 generates a feedback signal 12 so that the linear signal 41 becomes zero. In this way, wherever the magnetic head is, the linear signal indicative of a positional error from the closest track center is used for a closed loop control.

That is, the linear signal 41 is converted into the feedback signal 12 by the position correcting circuit 8 and applied to the power amplifier 9, wherein the positional error is converted into an electric current, which is applied to the head drive motor 13. The head drive motor 13 generates a force corresponding to the intensity of the electric current to drive the actuator 11 to which the magnetic head is attached. With such a closed loop control, the magnetic head is positioned at the center of a target track.

In order to make the magnetic head follow a track, a sector servo system is used in the magnetic disk device. In the sector servo system, the data tracks of a data surface are divided into a number of sectors, and position correcting information is recorded in each sector. The position correcting information is read out to correct the position of a magnetic head.

In general, one of the most difficult problems with recording and reproducing in a fixed or floppy magnetic disk device is to position the magnetic head accurately. That is, when data is reproduced with a magnetic head which is out of track caused by an external cause, the signal-to-noise ratio of an analog signal becomes low under the influence of a crosstalk with adjacent tracks or unerased residue data, thereby increasing the probability of a data error. Also, when data is recorded with the out-of-track head, a similar data error can take place. Most of the out-of-track errors are caused by mechanical or thermal errors. The representative errors include errors made in installation of the magnetic recording disks, the magnetic heads, and the magnetic head positioning mechanism, differences in thermal coefficients thereof, and a fall of the motor shaft for rotating the magnetic recording disks. Under these mechanical and thermal influences, the magnetic head moves out of track. This is generally called "off track."

In order to increase the magnetic recording density, it is necessary to increase either the bit density in the circumferential direction or the track density in the radial direction. In order to increase the track density, it is essential to reduce the off track. The degrees of the mechanical and thermal influences increase with the track density. For this reason, recent models employ a sector servo system to reduce these influences. In the sector servo system, position correcting information for correcting the off track is recorded at either the leading or trailing portion of each sector so that the data head reproduces the position correcting information to detect the amount of off track and moves the data head to the track center, thus providing the correct positioning.

FIG. 14 is helpful for explaining the sector servo system. The data surface 5 of a magnetic disk 10 is divided into n sectors $S_0, S_1, \ldots, S_{n-1}$. Each sector $S_i$ consists of a data area 81 in which the data is stored and a position correction information area 80 in which information for correcting the head position is recorded. The magnetic disk rotates in the direction of an arrow R so that each sector $S_i$ passes below the data head 6, which is movable in the radial direction of the magnetic disk, so that each piece of information is written or read. The data tracks 83 are formed concentrically and have an equal width. In order to write or read data, it is desired that the center of the magnetic head follows the center line of a data track 83 with few errors. The position correction information area 80 consists of an erasing portion 84, a synchronizing portion 85, and a position information portion 86. The position information portion 86 is used to make the data head 6 follow the track 83.

Position correcting information 32 and 33 is written in the position information portion 86 as shown in FIG. 15 to detect position errors (hereinafter "stack errors") of the servo head 2 and the data head 6 as shown in FIG. 16. For the data head 6a, a difference between the signal readout waveform 34a of the position correcting information 32 and the signal readout waveform 35a of the position correcting information 33 is converted into the amount of off track by the off-track detecting circuit 7 and applied to the position control circuit 4 and the position correction circuit 8. The output of the power amplifier 9 is supplied to the motor 13 to drive the actuator 11 so that the data head 6a is positioned at the center of a data track. When the data head 6c is selected, a difference between the signal readout waveforms 34b and 35b is taken to correct the head position in the same way as for the data head 6a.

As shown in FIG. 17, the servo pattern 61 and the position correction information 32 and 33 as described above are written by a dedicated writing device or servo writer 91 with the dust cover 93 removed. As shown in FIG. 18, then the dust cover 93 is attached to be ready for use. However, the mechanical distortion caused by the installation brings about a stack error and other causes for reducing the positioning precision.

In the conventional magnetic disk device, the head is positioned at the track center so that either of the positioning signals 45 and 46 becomes zero. Consequently, in order to increase the track density (or reduce the track width), it is necessary to reduce the width of positioning information written on the servo surface and the width of the servo head to read the information. For this reason, the influence of a medium defect of the magnetic disk becomes so large that it reduces the precision of head positioning.

In addition, the magnetic disk devices using the conventional sector servo system require a special instrument to write the position correction information. Also, the positional relationship between the servo head and the data head is changed by the mechanical distortion caused by the assembly of the dust cover after the position correction information is written by the installation of the device on the system housing, thereby causing a stack error. Another stack is caused by the atmospheric changes such as temperature changes, thus increasing the amount of position correction of the data head after the positioning of the servo head. For these reasons, the positioning precision becomes very low or it takes a long time to position the magnetic head accurately.

SUMMARY OF THE INVENTION

Accordingly, it is an object of the invention to provide a recording device having a high track density without reducing the writing width of positioning information and the read width of a servo head.

It is another object of the invention to provide a recording device capable of writing position correction information with its own head, thereby eliminating any influence of the mechanical distortion caused by the assembly and installation, thus resulting in the increased positioning precision.

In accordance with an embodiment of the invention there is provided a recording device which includes a unit operable in response to a first positioning signal to generate a second positioning signal for positioning the head at a track which is offset from the conventional track.

In this embodiment, the head is positioned at a new track between the conventional tracks. That is, positioning signals A and B are used to generate new positioning signals C and D, the signal levels of which become zero between the adjacent tracks in the conventional device. Thus, these positioning signals are used to make tracks for performing a closed loop positioning control, thereby providing a high track density recording device.

In accordance with another embodiment of the invention there is provided a recording device using a sector servo system, which includes a unit for using the second positioning signal for positioning the head at a position correction information area which is offset from the conventional track, thereby making it possible to write the position correction information with its own head. With a capability of positioning the head at a position offset from the track, the recording device is able to position the data head at the position correction information area and write the position correction information by itself, thereby eliminating the influence of a mechanical distortion caused by the assembly and installation of the device.

The above and other objects, features, and advantages of the invention will become more apparent from the following description when taken in conjunction with the accompanying drawings.

DESCRIPTION OF THE PREFERRED EMBODIMENT

Embodiments of the invention will be described below. However, the head positioning system is the same as described above and, therefore, its description will be omitted.

Figure 1:
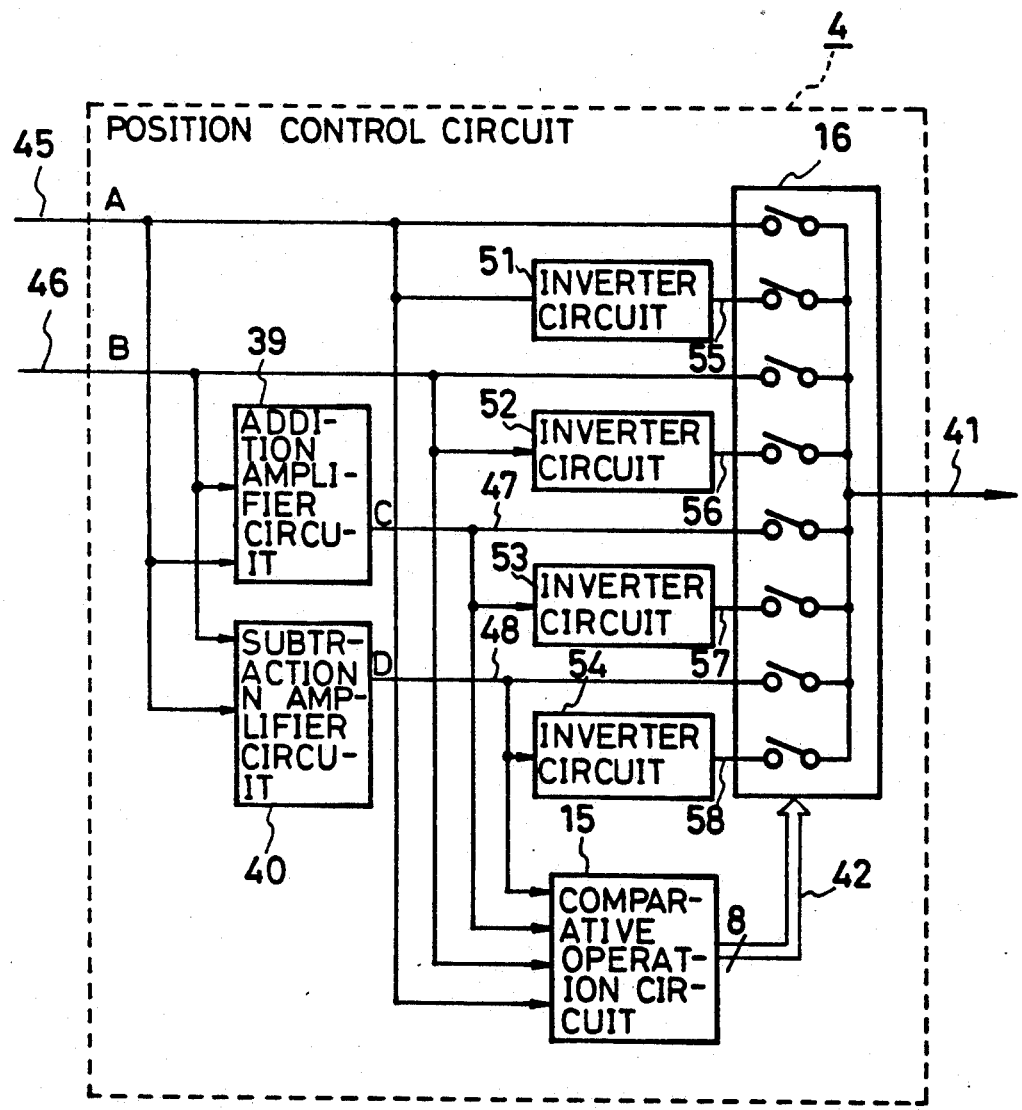
FIG. 1 is a block diagram of a position control circuit according to an embodiment of the invention.
Figure 12:
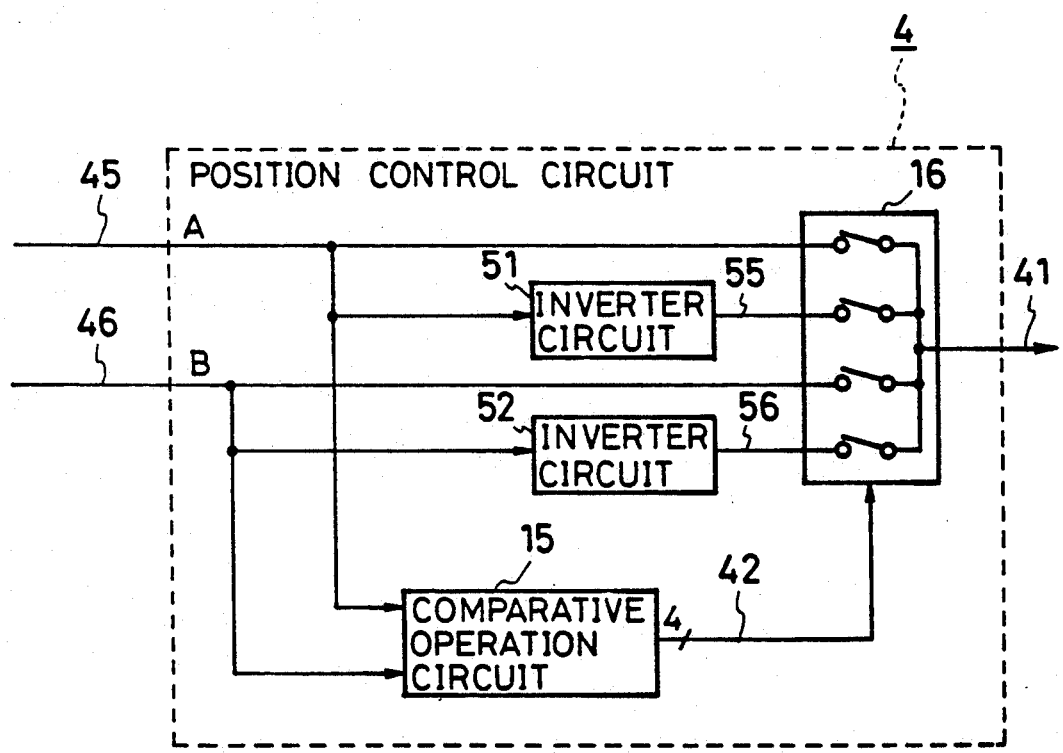
FIG. 12 is a block diagram of a conventional position control circuit.
Figure 13:
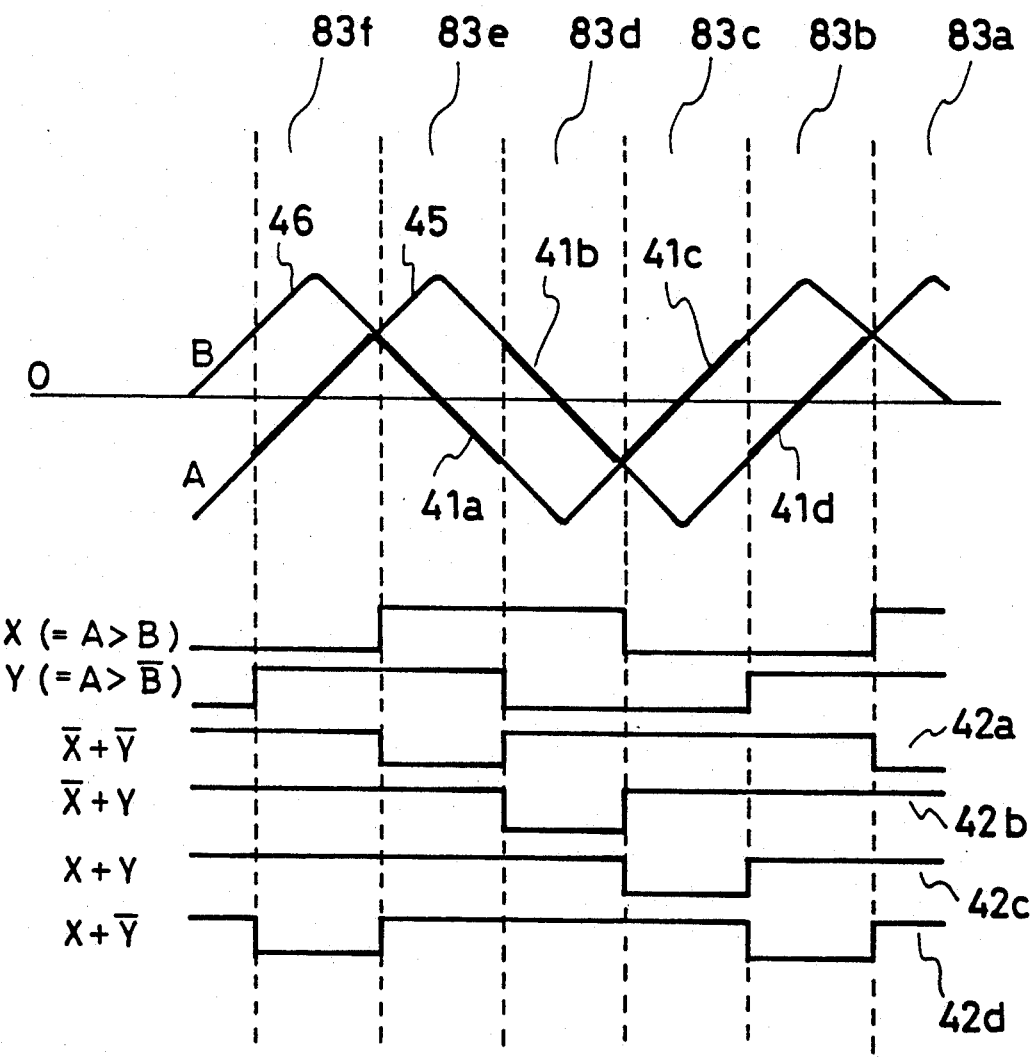
FIG. 13 is a timing chart useful for explanation of how a positioning signal is generated by the conventional device.
Figure 14:
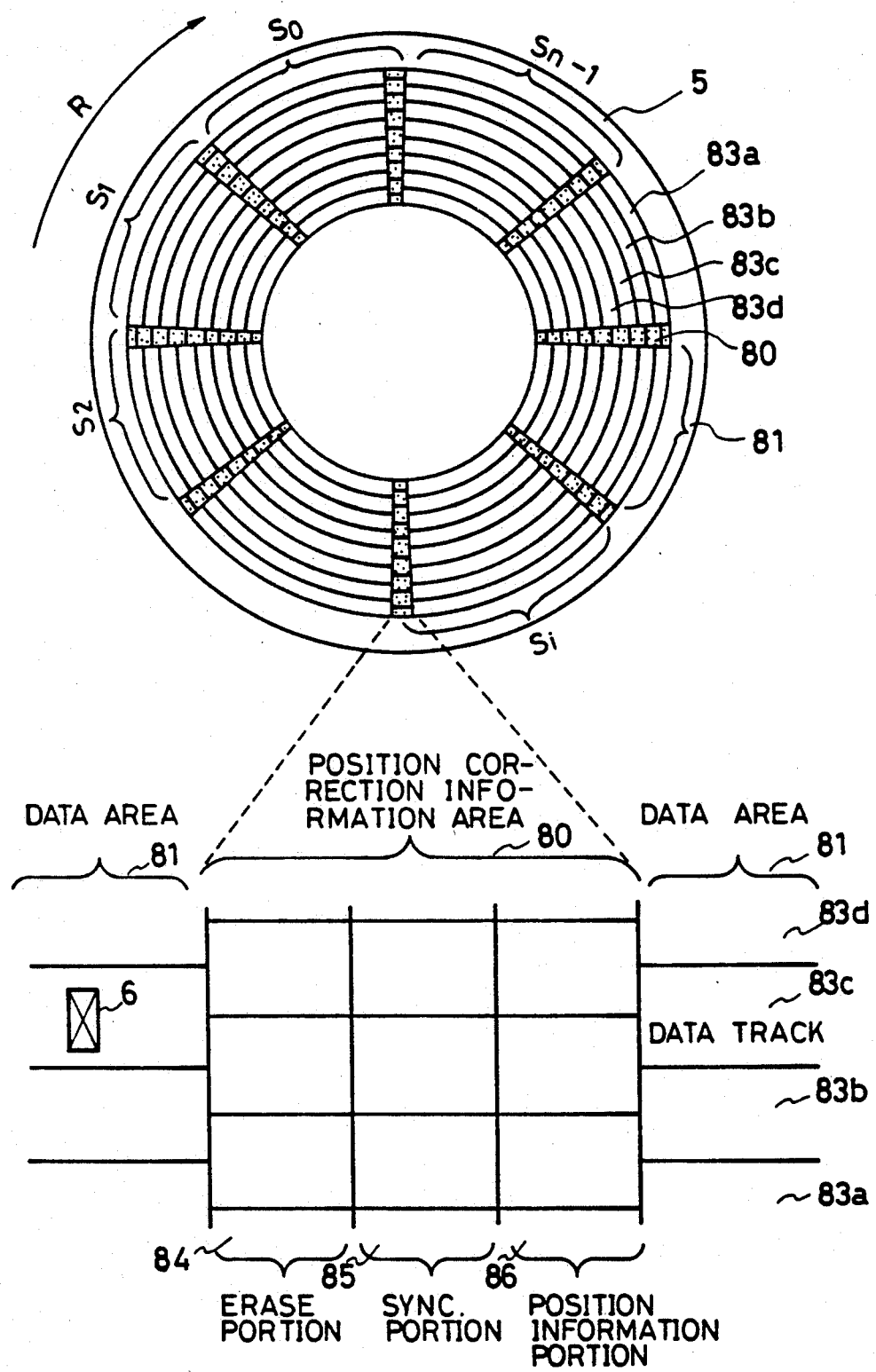
FIG. 14 is a diagram useful for explanation of how the sector servo system works.
Figure 15:
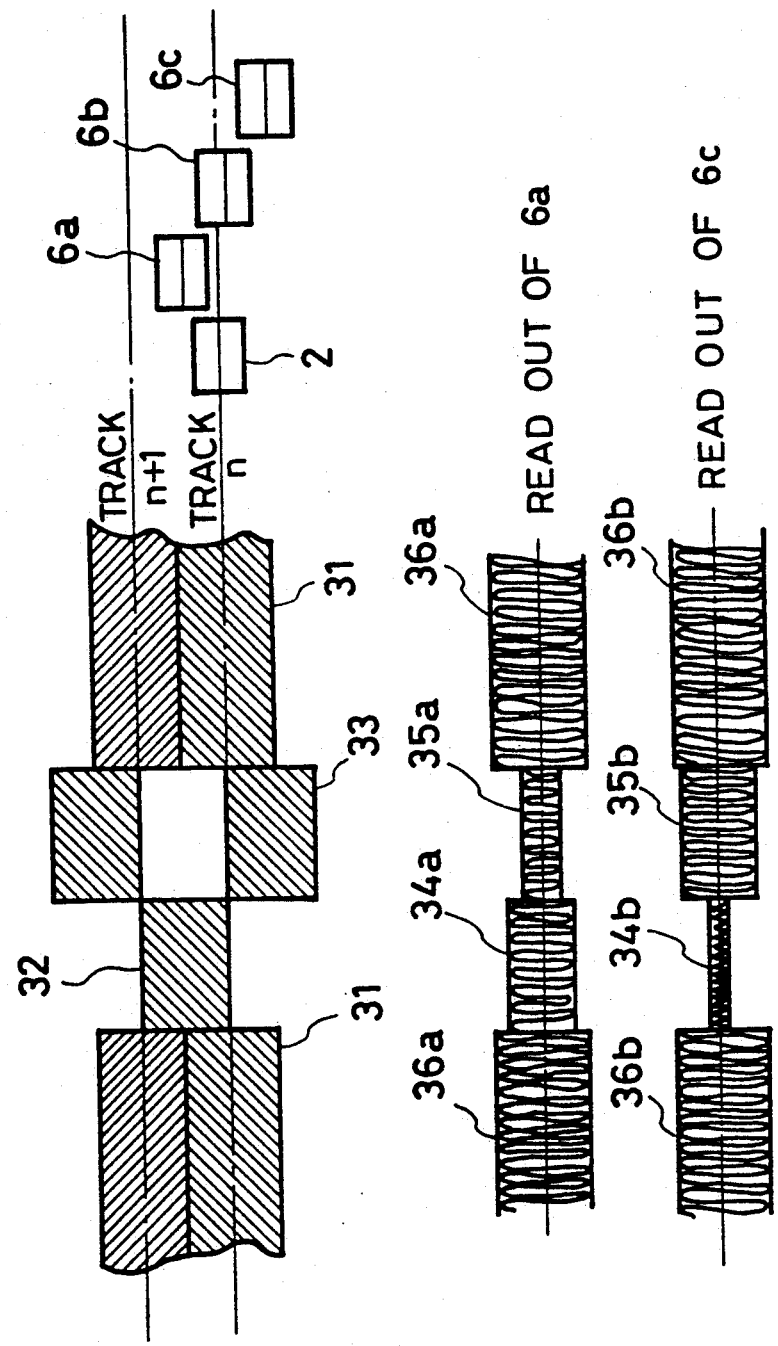
FIG. 15 is a diagram useful for showing the relationship between the position correction information and the positions of the data head and the readout waveforms.
Figure 16:
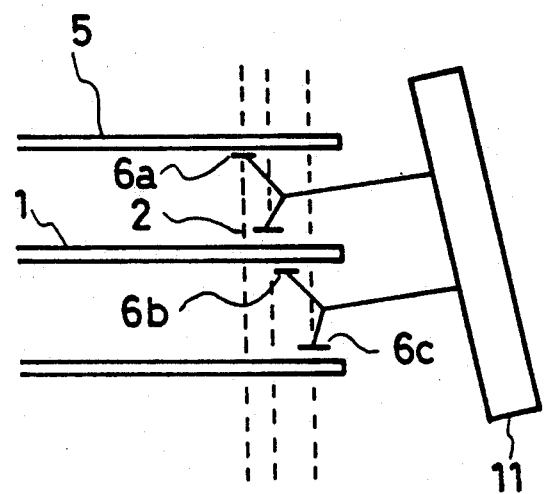
FIG. 16 shows the positional relationship between the servo head and the data head when a stack error takes place.
Figure 17:
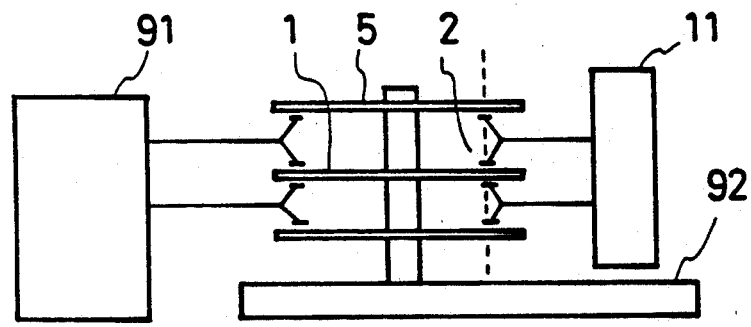
FIG. 17 is a side view of the disk device with a servo writer.
Figure 18:
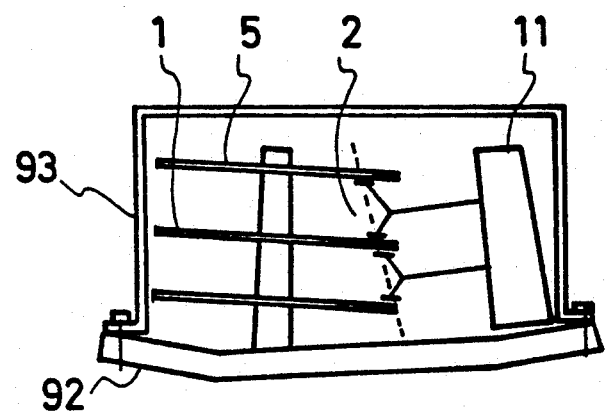
FIG. 18 is a side view of the disk device with a dust cover, showing how a stack error is caused by the installation of the dust cover.

In FIG. 1, the position control circuit 4 is the same as that of FIG. 12 except for an addition amplifier circuit 39 for generating a sum signal 47 (hereinafter "position signal C") and a subtraction amplifier circuit 40 for generating a difference signal 48 (hereinafter "position signal D"). The addition amplifier circuit 39 and the subtraction amplifier circuit 40 constitute a unit for generating the second positioning signals. The linear signal 41 is selected from the positioning signals A-D and their inverted signals 55-58.

Figure 2:
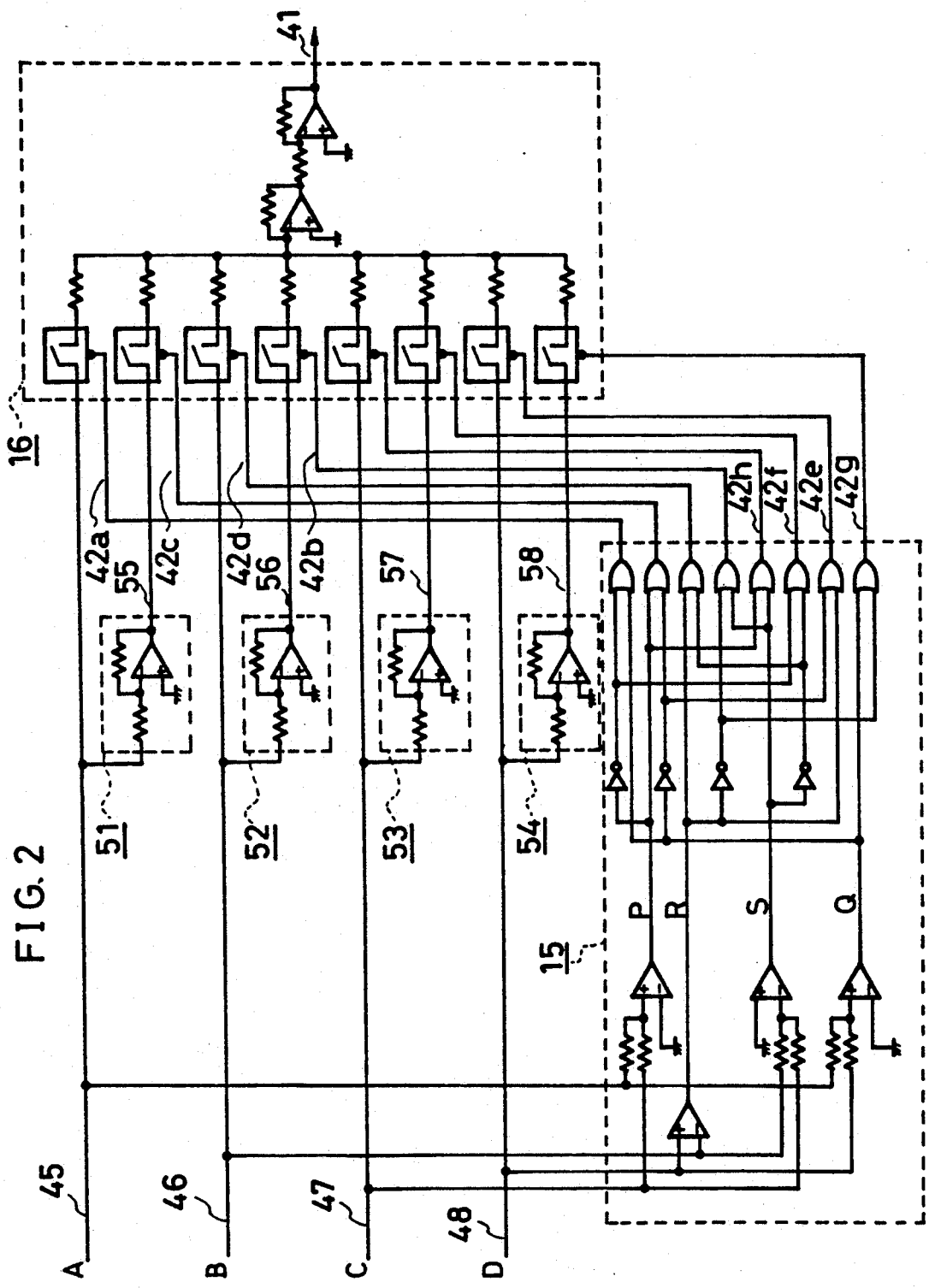
FIG. 2 is a schematic diagram of a comparative operation circuit, an inverter circuit, and an analog switch useful for the position control circuit of FIG. 1.

The comparative operation circuit 15, the inverter circuits 51-54, and the analog switch 16 of FIG. 1 are shown in FIG. 2 in more detail. The position error detection circuit 3 generates the first positioning signals A and B. The position control circuit 4 and the position correction circuit 8 constitute a control unit.

Figure 3:
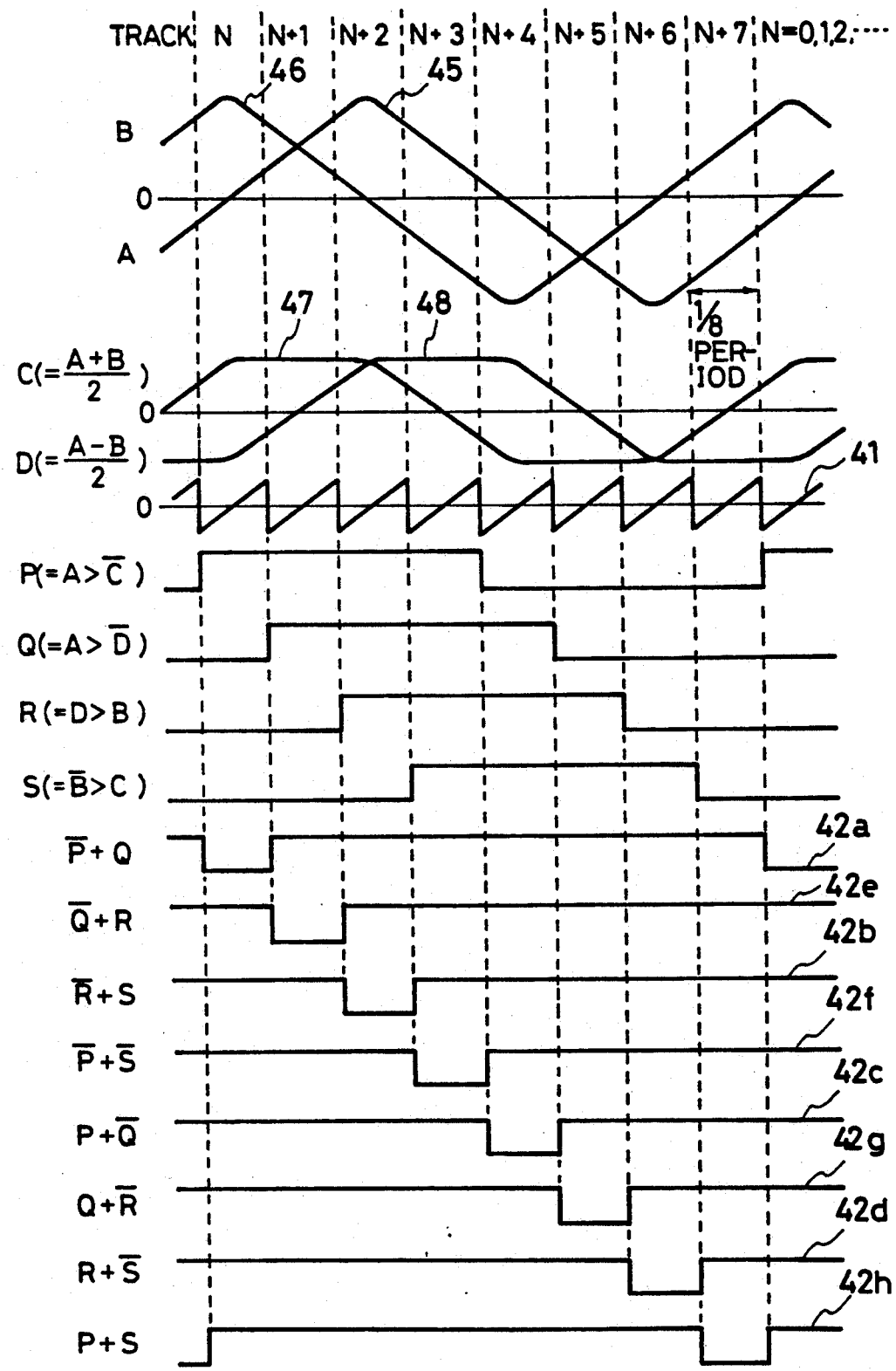
FIG. 3 is a timing chart for explaining how the position control circuit of FIG. 1 provides a positioning signal.

The operation of the position control circuit will be described with reference to FIG. 3. When the position signals A and B are added and subtracted and amplified by a half to generate position signals C and D, the position signals A-D intersect the zero line every ¼ period. The entire area of the tracks are divided into two sections according to the fact that the position signal A is greater than the inverted position signal C as indicated by a logic signal P. Similarly, logic signals Q, R, and S, which are offset by a ¼ period from the prior signal, are obtained by dividing the entire area by the fact that the position signal A is greater than the inverted position signal D, the position signal D is greater than the position signal B, and that the inverted position signal B is greater than the position signal C. These four logic signals P-S, positive and negative, are combined to generate eight logic signals or window signals 42a-42h. These processes are carried out by the comparative operation circuit 15 in FIGS. 1 and 2. Only a signal selected from the position signals A-D and their inverted signals 55-58 by the window signal 42 is outputted as a linear signal 41 by the analog switch 16.

In such a system, the linear signal 41 intersects the zero level eight times a period of the position signal A or B. When the track center is taken at the point where the linear signal 41 becomes zero, the number of tracks in a period of the position signal or track density becomes twice the conventional one.

As has been described above, the magnetic disk device according to the first embodiment of the invention includes the position error detection circuit for detecting a position error between the head and the track center to generate two positioning signals which are continuous and periodic over the entire tracks and offset by a ¼ period in phase, the positioning signals being used for a closed loop positioning control of the head; and circuits for generating a sum signal and a difference signal of the two positioning signals for performing a closed loop positioning control of the head by using the positioning signals and the sum and difference signals.

In the above embodiment, the off-track detection circuit 7 is not necessary. As a result, this disk device is applicable to a recording device which does not use any sector servo system.

Figure 4:
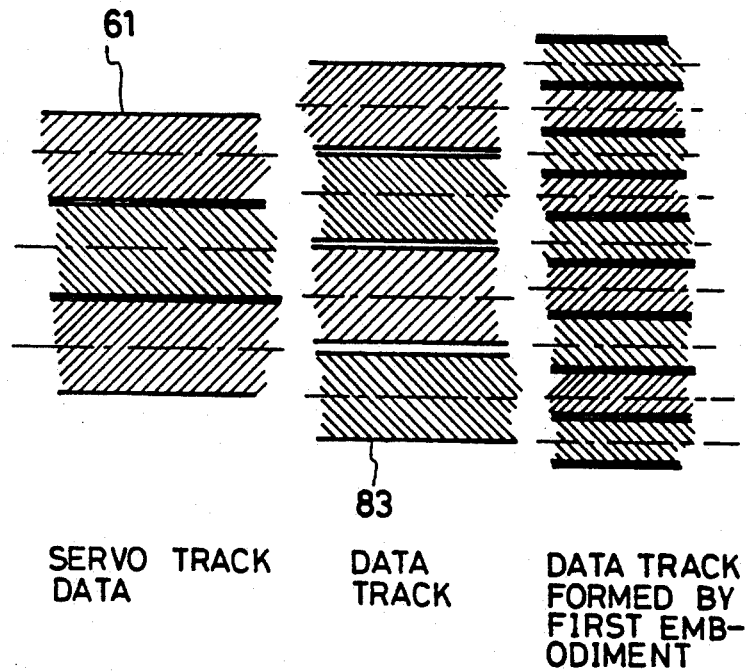
FIG. 4 shows the data tracks formed by the position control circuit of FIG. 1.

The data tracks formed by the disk device according to this embodiment are shown in FIG. 4.

Figure 5:
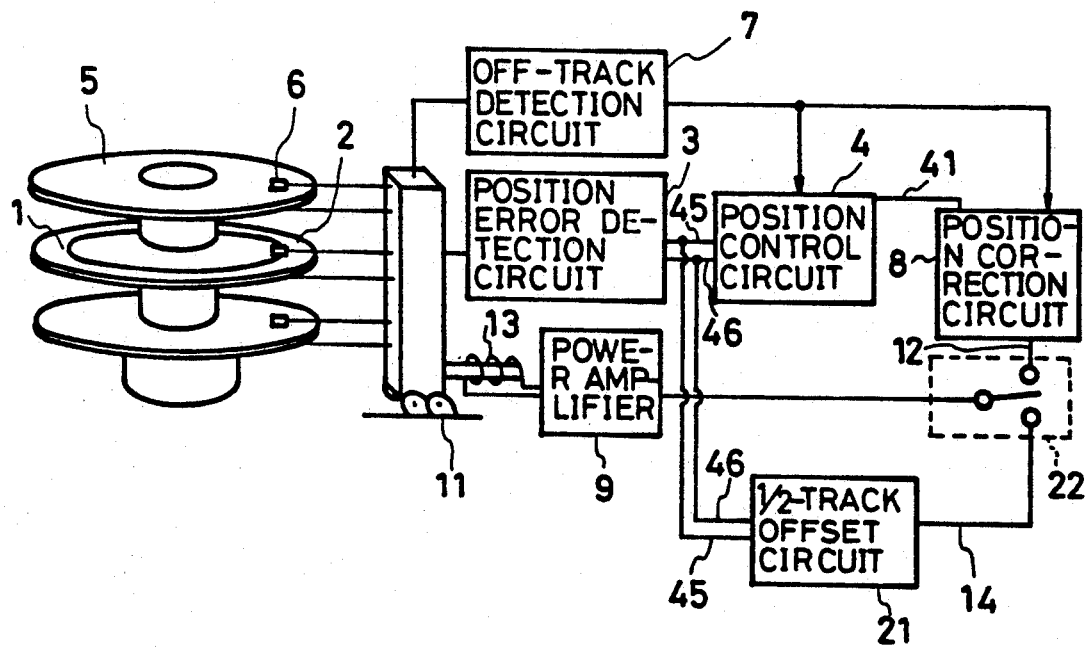
FIG. 5 is a block diagram of a disk device according to another embodiment of the invention.
Figure 6:
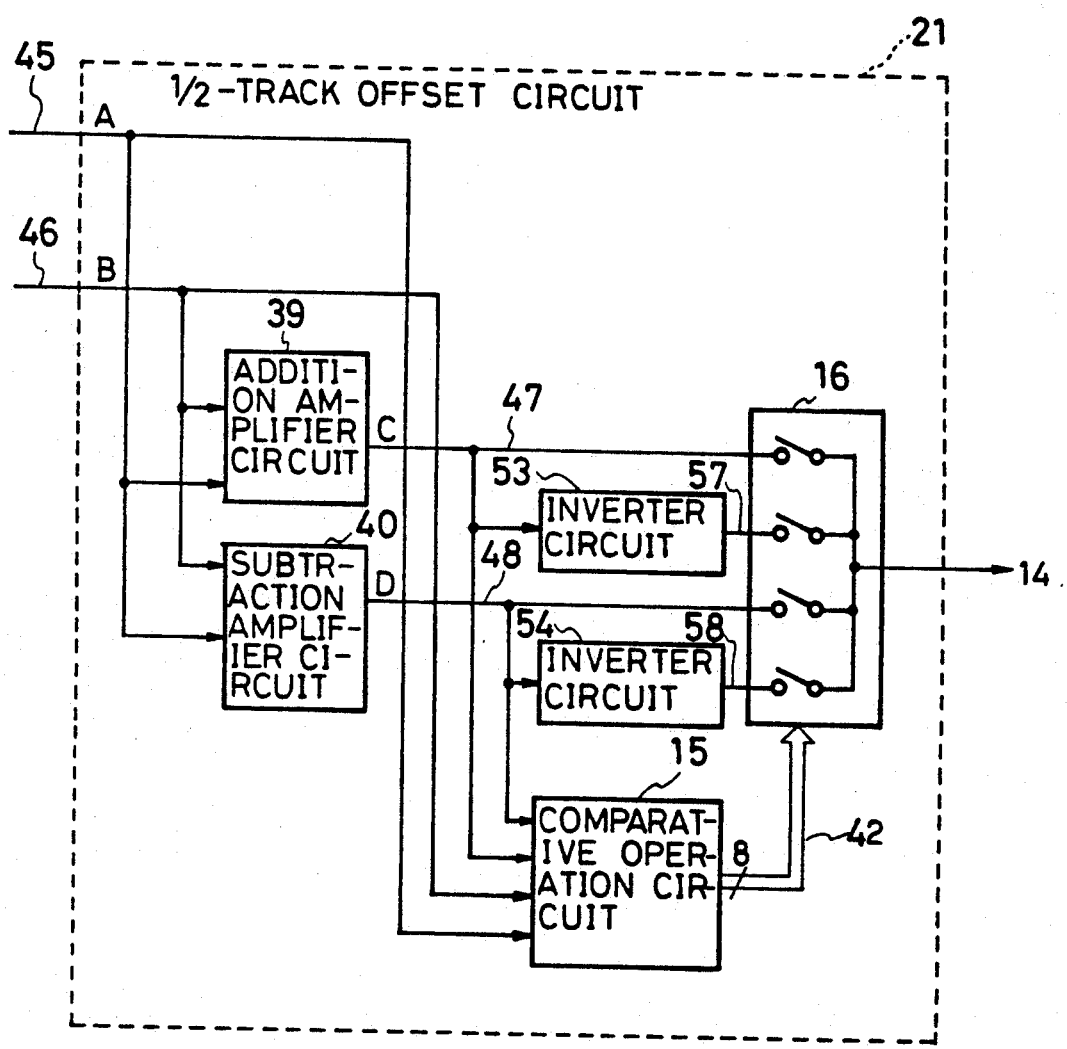
FIG. 6 is a block diagram of a ½-track offset circuit useful for the disk device of FIG. 5.
Figure 7:
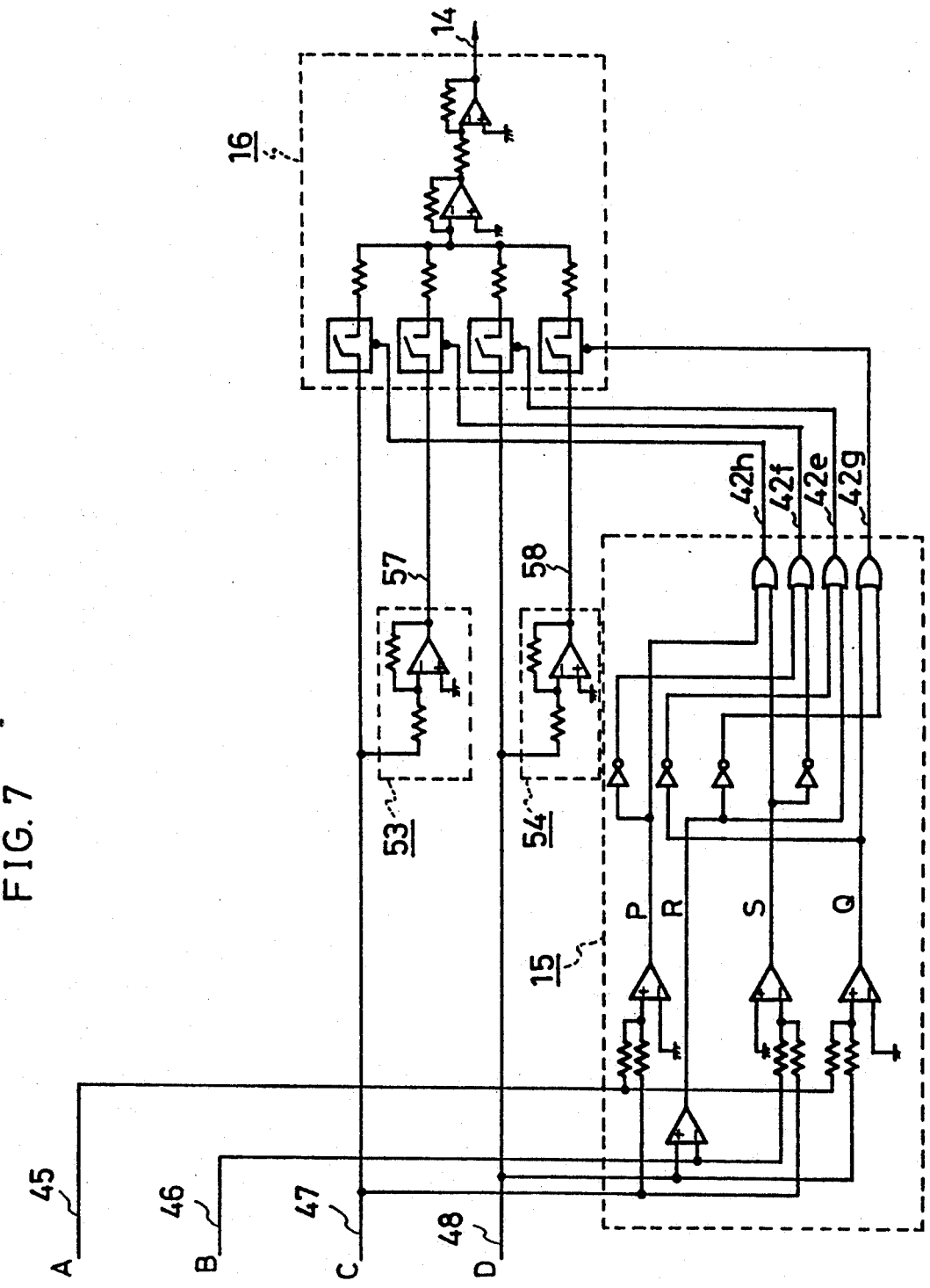
FIG. 7 is a schematic diagram of a comparative operation circuit, an inverter circuit, and an analog switch useful for the offset circuit of FIG. 6.
Figure 10:
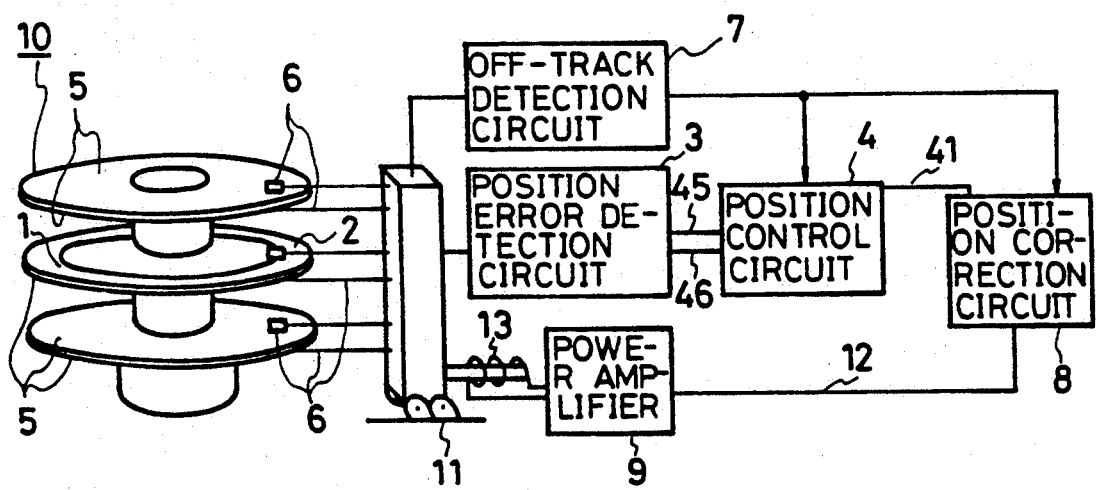
FIG. 10 is a block diagram of a conventional disk device.
Figure 11:
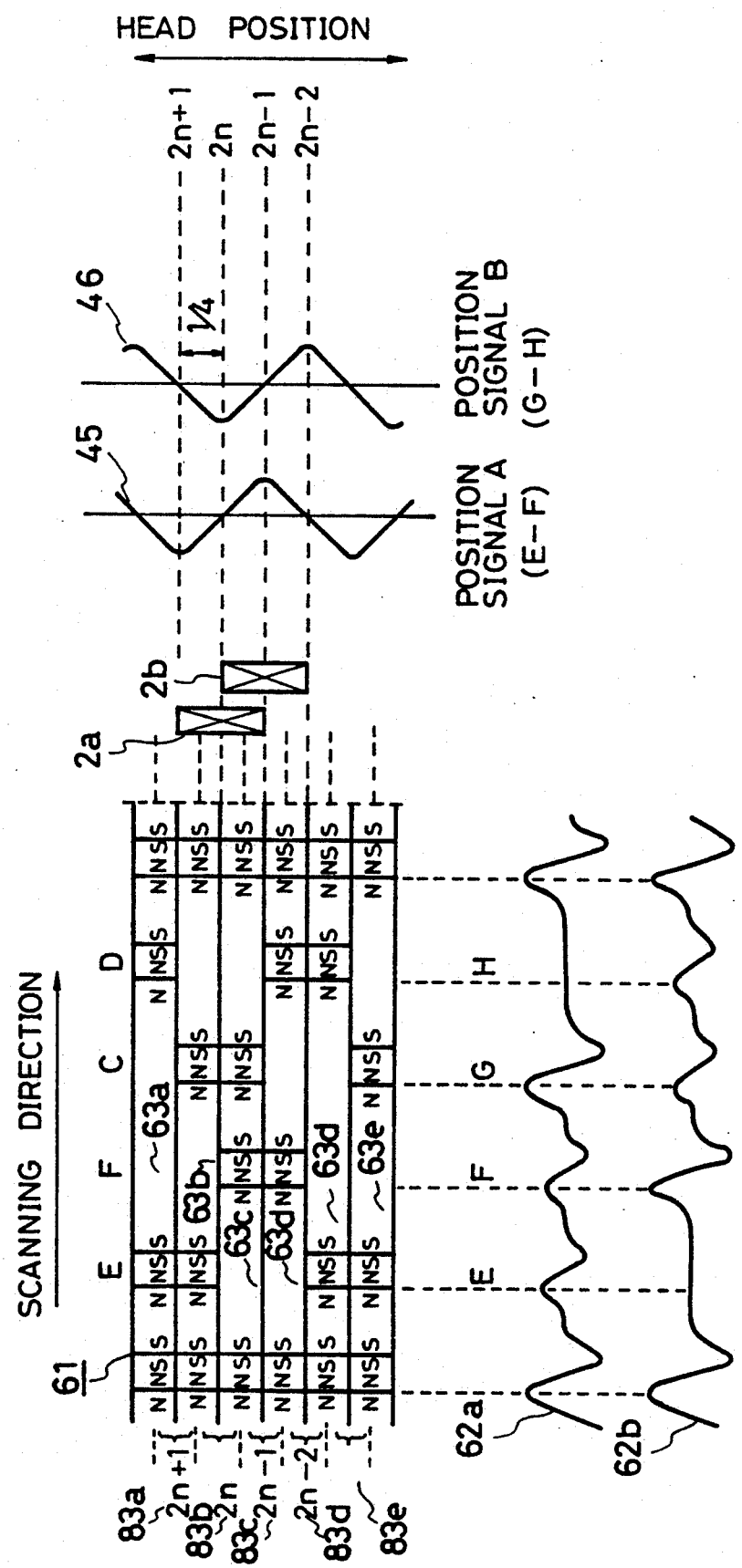
FIG. 11 shows how positioning signals are generated from the positioning information.

FIG. 5 shows a disk device according to another embodiment of the invention, wherein like characters denote like or corresponding parts of FIG. 10, and their description will be omitted. This disk device is the same as that of FIG. 10 except for a ½-track offset circuit 21 and a position selection circuit 22. FIGS. 6 and 7 show in more detail the ½-track offset circuit, and the comparative operation circuit 15, the inverter circuit 53 and 54, and the analog switch 16, respectively.

Figure 8:
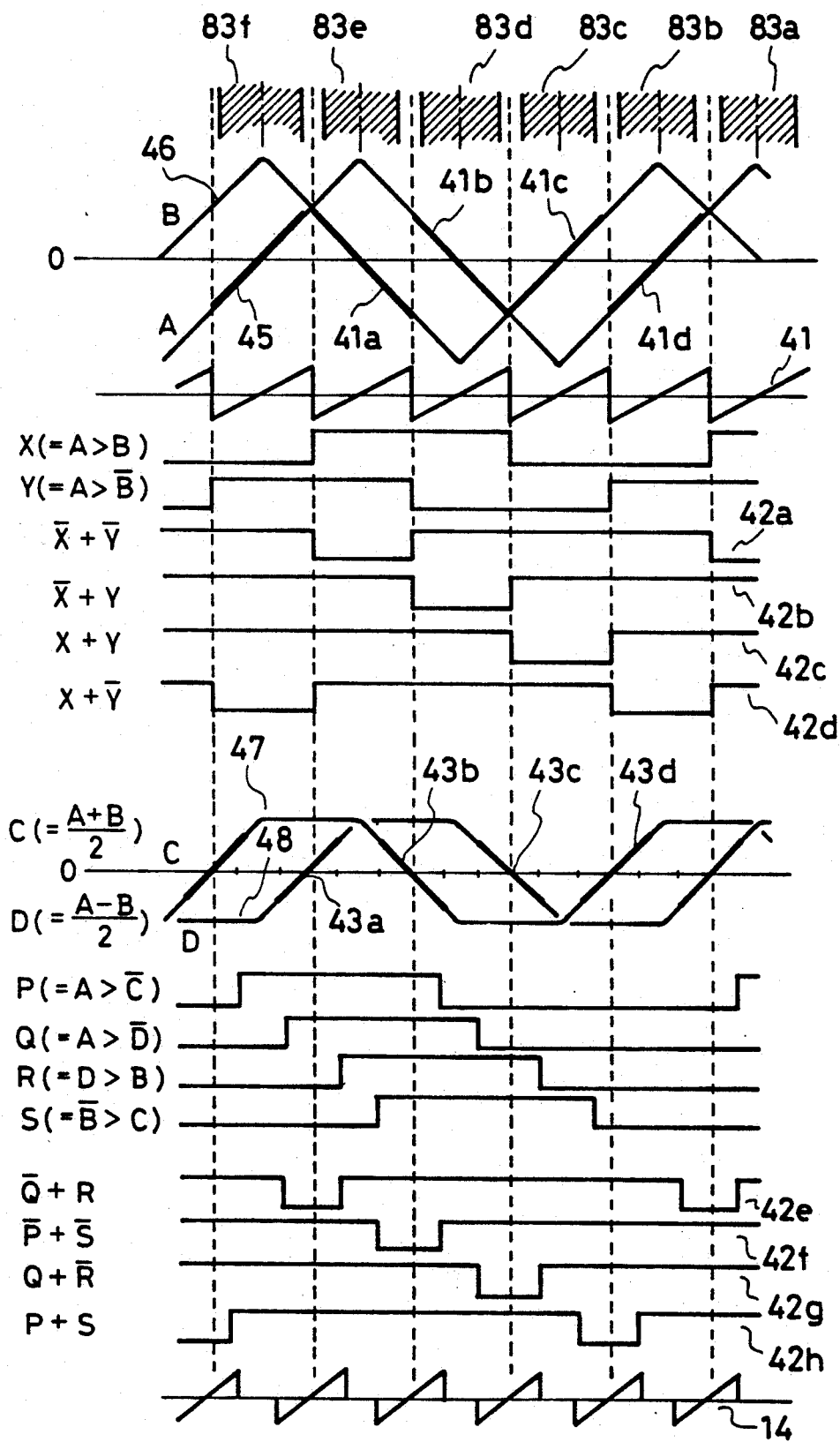
FIG. 8 is a timing chart useful for explaining how the disk device of FIG. 5 generates a positioning signal.

The operation of this disk device will be described with reference to FIG. 8. The ½-track offset circuit 21 perform sum and subtraction operations on the position signals A and B and amplifies the sum and difference by a half to generate position signals C and D. Window signals 42e-42h, which are offset a ½ track with respect to the window signals 42a-42d, are generated by combining these position signals A-D. Linear signals 43 are generated by selecting the position signals C and D and their inverted signals 57 and 58 with the offset window signals 42e-42h. An offset feedback signal 14 is generated based on the selected linear signal. The offset feedback signal 14 is selected by the position, selection circuit 22 and applied to the power amplifier 9. The head drive motor 13 drives the actuator 11 to bring the data head 6 to a position which is offset by a ½-track from the center of a track.

The position error detection circuit 3 serves as a unit for generating the first positioning signals. The ½-track offset circuit 21 serves as both a unit for generating the second positioning signals and a control unit for writing the position correction information. The position control circuit 4, the position correction circuit 8, and the offset detection circuit 7 constitute a control unit for reading and writing information.

As has been described above, the magnetic disk device according to the second embodiment of the invention includes a servo surface on which positioning information is written; a servo head for reading the positioning information; magnetic disks each having tracks in which data is written corresponding to the positioning information and position correction information areas offset by ½ track from the tracks in which position correction information is written; and a unit operable in response to the positioning information read by the servo head to generate positioning for bringing the head to a position a ½ track from the track to write the position correction information.

More specifically, the disk device includes a unit operable in response to the positioning information to generate two positioning signals which are continuous over the entire tracks and offset by ¼ period in phase and new positioning signals consisting of the sum and difference of the two positioning signals and a unit operable in response to these positioning signals to bring the head to a position a ½ track from the above track.

Figure 9:
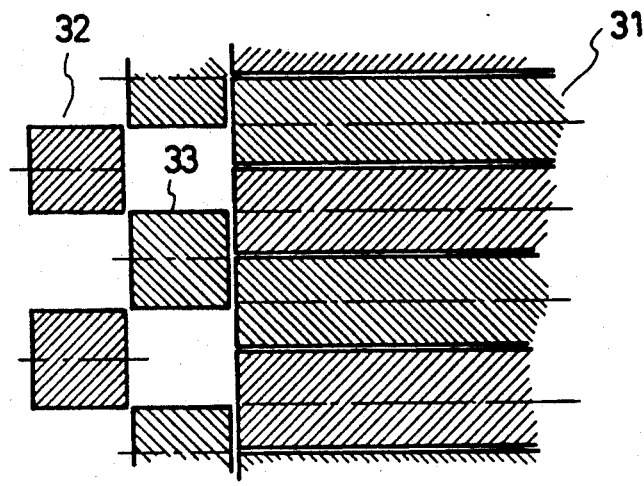
FIG. 9 shows the position correction information and data tracks formed by the disk device of FIG. 5.

The position correction information and the data tracks formed by this disk device are shown in FIG. 9.

In the above two embodiments, the positioning of the head at a ½ track has been described, but the position signals may be modified to make positioning at a ⅓ or ¼ track. The concentric tracks may be linear tracks. The fixed magnetic disk device may be replaced by a flexible disk device, cartridge disk device, optical disk device, or magnetic tape device.

As has been described above, according to the first embodiment, the positioning signal is used for positioning between the adjacent tracks so that the track density is increased with simple circuitry. In addition, since it is not necessary to reduce the write width of positioning information or the read head, the influence of a medium defect is controlled, thereby avoiding a decrease in the positioning precision, and providing a high precision, high track density head positioning device.

With the second embodiment, it is possible to perform positioning and writing in the position correction information area with the same device, providing a high precision recording device which is free from the influence of the mechanical distortion caused by the assembly and installation.

We claim:
1. A recording device comprising:
(a) a head for writing and reading information;
(b) a recording medium having tracks on which head positioning information is written;
(c) first means operable in response to said head positioning information to generate a first positioning signal for positioning said head at a predetermined track, said first means comprising a positioning error detection circuit operable in response to said positioning information to detect a position error between said head and a track center to generate two positioning signals A and B which are continuous and periodic over all tracks and offset a quarter period in phase;
(d) second means operable in response to said first positioning signal to generate a second positioning signal for bringing said head to a position between predetermined adjacent tracks, said second means comprising
an addition amplifier circuit for summing said positioning signals A and B to generate a sum signal and amplifying said sum signal by a half to generate a positioning signal C; and
a subtraction amplifier circuit for subtracting said positioning signal B from said positioning signal A to generate a differential signal and amplifying said differential signal by a half to generate a positioning signal D; and
(e) control means operable in response to either of said first and second positioning signals to position said head at a track for writing or reading information, said control means comprising
a position control circuit operable in response to window signals obtained from comparative operations on said positioning signals A–D and their inverted signals to select a signal from the group consisting of said positioning signals A–D and their inverted signals for generating a linear signal; and
a position correction circuit responsive to said linear signal for generating a feedback signal for controlling the position of said head so that said linear signal becomes zero.
2. The recording device of claim 1, wherein said position control circuit comprises:
a subtraction amplifier circuit;
inverter circuits for generating inverted signals of said positioning signals A–D;
a comparative operation circuit for comparing said positioning signals A–D to generate as window signals eight logic signals which are offset a ⅛ period in phase; and
an analog switch operable in response to said window signals to select a signal from the group consisting of said positioning signals A–D and their inverted signals and output it as a linear signal.
3. A recording device comprising:
(a) a head for writing and reading information;
(b) a record medium having head positioning information written thereon and tracks each having:
(b1) a data area on which data is written in a predetermined direction; and
(b2) a position correction information area on which head position correction information is written at a position offset from said data area;
(c) first means operable in response to said head positioning information to generate a first positioning signal for bringing said head to a predetermined track;
(d) second means operable in response to said first positioning signal to generate a second positioning signal for bringing said head to a position correction information area;
(e) position correction information writing control means operable in response to said second positioning signal to bring said head to said position correc- tion information area for writing said position correction information; and '(f) position correction information reading control means operable in response to said first positioning signal to position said head and in response to said position correction information to correct a position of said head;

wherein said first means comprises a position error detection circuit operable in response to said positioning information to detect a position error between said head and a track center to generate two positioning signals A and B which are continuous and periodic over all tracks and offset a quarter period in phase;

said second means comprises:

an addition amplifier circuit for summing said positioning signals A and B to generate a sum signal and amplifying said sum signal by a half to generate a positioning signal C; and a subtraction amplifier circuit for subtracting said positioning signal B from said positioning signal A to generate a differential signal and amplifying aid differential signal by a half to generate a positioning signal D; and position correction information reading control means comprises:

a position control circuit operable in response to window signals obtained from comparative operations on said positioning signals A-D and their inverted signals to select a signal from the group consisting of said positioning signals A-D and their inverted signals for generating a linear signal;

a position correction circuit operable in response to said linear signal to generate a feedback signal for controlling the position of said head so that said linear signal becomes zero; and an offset detection circuit operable in response to said head position correction information to detect a position error and feed it to said position control circuit and said position correction circuit.

4. The recording device of claim 3, wherein said position correction information writing control means comprises a half-track offset circuit for generating new window signals offset a half track from said window signals by comparative operations on said positioning signals A-D and outputting as an offset feedback signal a linear signal selected from the group consisting of said positioning signals C and D and their inverted signals with said offset window signal.

5. The recording device of claim 3, wherein said position control circuit comprises:

inverter circuits for providing inverted signals of said positioning signals A and B;

a comparative operation circuit for comparing said positioning signals A and B to generate as window signals four logic signals which are offset a ¼ period in phase; and an analog switch operable in response to said window signal to select a signal from the group consisting of said positioning signals A and B and their inverted signals and output it as a linear signal.

6. The recording device of claim 5, wherein said half-track offset circuit comprises:

an addition amplifier circuit;

a subtraction amplifier circuit;

inverter circuits for providing inverted signals of said positioning signals C and D;

a comparative operation circuit operable in response to comparative operations on said positioning signals A-D to generate four logic signals a half track offset from said window signals and output them as offset window signals; and an analog switch for outputting as an offset feedback signal a linear signal selected from the group consisting of said positioning signals C and D and their inverted signals with said offset window signal.

7. The recording device of claim 5, which further comprises a position selection circuit for selecting either a feedback signal from said position correction circuit or an offset feedback signal from said half-track offset circuit.

8. A head positioning method for a recording device which includes a head, a multitrack recording medium, and head positioning information recorded on said recording medium, comprising the steps of:

(a) generating a first positioning signal from said head positioning information for directing said head to follow a predetermined track, said first positioning signal generating step comprising the steps of reading said head positioning information from said recording medium;

creating a position signal A which intersects a zero signal line at the center of every other track and increases in absolute value when said head moves off said center; and creating a position signal B which intersects said zero signal line at the center of every other track at which said position signal A does not intersect said zero signal line and increases in absolute value when said head moves off said center;

(b) generating a second positioning signal from said first positioning signal for directing said head to follow a predetermined intermediate track between two adjacent tracks, said second positioning signal generating step comprising the steps of creating a position signal C which intersects said zero signal line at the center of every other intermediate track and increases in absolute value when said head moves off said center; and creating a position signal D which intersects said zero signal line at the center of every other intermediate track at which said position signal C does not intersect said zero signal line and increases in absolute value when said head moves off said center;

(c) selecting a positioning signal from the group consisting of said first and second positioning signals, said selecting step comprising the steps of providing a window signal for selecting a signal from the group consisting of said first and second position signals and their inverted position signals; and outputting said selected signal as a linear signal corresponding to said window signal, said window signal providing step comprising the steps of creating logic signals based on said position signals A, B, C, and D, and making a logical calculation of said logic signals and their inverted signals for creating said window signal; and (d) controlling said head according to said selected positioning signal so that said head follows a center of said intermediate track.

9. The head positioning method of claim 8, wherein said position signal C creating step comprises the steps of:

summing said position signals A and B to generate a sum signal; and amplifying said sum signal by a half to create said position signal C.

10. The head positioning method of claim 8, wherein said position signal D creating step comprises the steps of:
  subtracting said position signal B from said position signal A to generate a differential signal; and
  amplifying said differential signal by a half to create said position signal D.

11. The head positioning method of claim 8, wherein said step of creating logic signals comprises the steps of:
  creating a logic signal P which represents an area in which said position signal A is greater than an inverted signal of said position signal C, or $A > \overline{C}$;
  creating a logic signal Q which represents an area in which said position signal A is greater than an inverted signal of said position signal D, or $A > \overline{D}$;
  creating a logic signal R which represents an area in which said position signal D is greater than said position signal B, or $D > B$; and
  creating a logic signal S which represents an area in which said inverted signal of said position signal B is greater than said position signal C, or $\overline{B} > C$.

12. The head positioning method of claim 11, wherein said making step comprises the steps of:
  inverting said logic signals P, Q, R and S to make logic signals $\overline{P}, \overline{Q}, \overline{R}$ and $\overline{S}$, respectively;
  making a logical product AND of said logic signals $\overline{P}$ and Q;
  making a logical product AND of said logic signals $\overline{Q}$ and R;
  making a logical product AND of said logic signals $\overline{R}$ and S;
  making a logical product AND of said logic signals $\overline{P}$ and $\overline{S}$;
  making a logical product AND of said logic signals P and $\overline{Q}$;
  making a logical product AND of said logic signals Q and $\overline{R}$;
  making a logical product AND of said logic signals R and $\overline{S}$; and
  making a logical product AND of said logic signals P and S.

13. The head positioning method of claim 8, wherein said controlling step comprises the steps of:
  receiving said linear signal; and
  correcting said head position to reduce an absolute value of said linear signal so that said head follows said center of said intermediate track on which said head is desired to be for reading/writing data.

* * * * *